A. B. KIDDER.
LAWN MOWER.
APPLICATION FILED DEC. 12, 1913.

1,121,257.

Patented Dec. 15, 1914.
2 SHEETS—SHEET 1.

Witnesses
E. S. Hall.
Hazel Owen.

Inventor
Arthur B. Kidder.

By
Bond & Miller
Attorneys

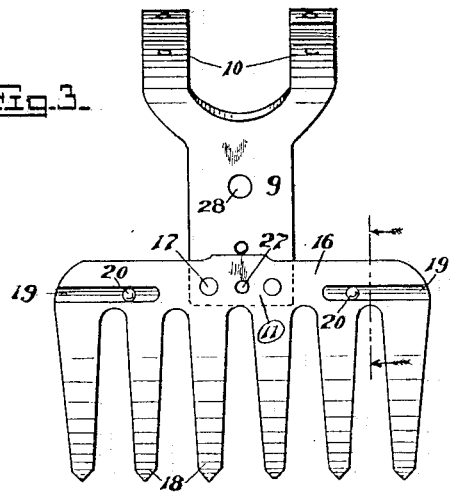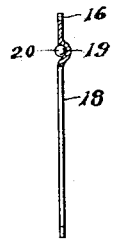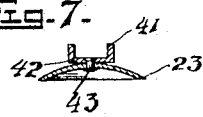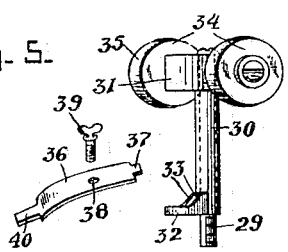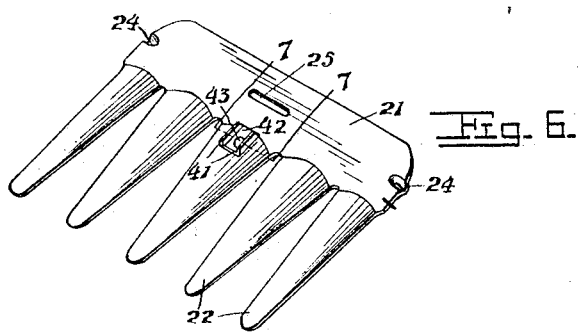

UNITED STATES PATENT OFFICE.

ARTHUR B. KIDDER, OF CANTON, OHIO, ASSIGNOR TO THE VICTOR SPECIALTY COMPANY, OF CANTON, OHIO, A CORPORATION OF OHIO.

LAWN-MOWER.

1,121,257. Specification of Letters Patent. Patented Dec. 15, 1914.

Application filed December 12, 1913. Serial No. 806,133.

*To all whom it may concern:*

Be it known that I, ARTHUR B. KIDDER, a citizen of the United States, residing at Canton, in the county of Stark and State of Ohio, have invented a new and useful Lawn-Mower, of which the following is a specification.

My invention relates to improvements in lawn mowers, and especially to that type of lawn mowers in which stationary and reciprocating cutter bars having forwardly projecting blades are provided.

The objects of the invention are to generally improve devices of the character mentioned, to provide a simple, strong and efficient lawn mower which will be light, easily operated, and capable of being made in various sizes, as may be desired.

Further objects are the provision of appropriate bearings for the reciprocating blade, a device for spring-pressing the reciprocating blade against the stationary blade to hold the same in proper relative position thereto, and improved means for producing reciprocation of the reciprocating blade by rotation of the driving wheels.

These objects, together with other objects readily apparent to those skilled in the art, may be attained by the construction illustrated in the accompanying drawings, although the invention may be embodied in other forms, the construction illustrated being of a small grass clipper, chosen by way of example.

Figure 1:
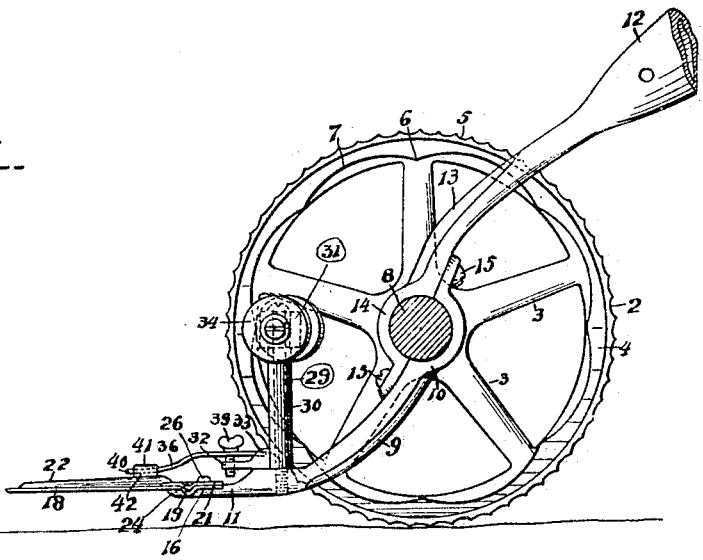
Figure 2:
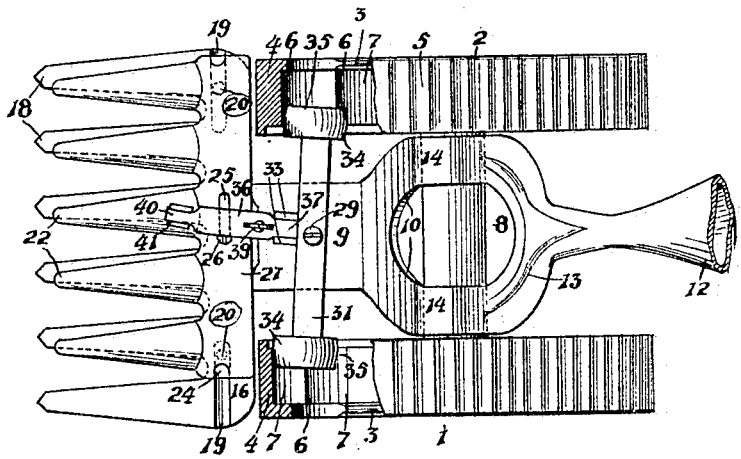

In the drawings Figure 1 is a side elevation of a grass clipper embodying my invention the near driving wheel being removed and the main shaft shown in section. Fig. 2 is a top view of the same clipper, parts of the tread flanges of the driving wheels being broken away. Fig. 3 is a top view of the cutter bar carrying frame with the stationary cutter bar connected thereto. Fig. 4 is a sectional view of the stationary cutter bar on the line 4—4 of Fig. 3. Fig. 5 is a view in perspective showing the driving wheel engaging rollers, oscillating arm and post and cutter bar spring and adjusting screw, said spring and screw being separated from the other parts to more fully disclose the construction. Fig. 6 is a perspective view of the reciprocating cutter bar. Fig. 7 is a sectional view on the line 7—7 of Fig. 6.

Throughout the several views similar reference numerals indicate similar parts.

More specifically describing the construction disclosed in the said drawings, the numerals 1 and 2 indicate the two driving wheels, which are provided with the spokes 3 at their outer sides, the flanges 4 extending inwardly from said spokes, as clearly illustrated in Fig. 2. Externally the flnages 4 are provided with transverse grooves and ridges 5 or an equivalent roughened surface for the purpose of obtaining better purchase or traction on the ground, and internally said flnages are provided with an annular series of undulations formed by the annularly spaced crests 6 and the intermediate, curved depressions 7.

The wheels 1 and 2 are fixedly mounted upon the two ends of the shaft 8, the crests 6 of each wheel being in axially parallel alinement with points intermediate the crests on the other wheel, as clearly shown in Fig. 2.

The cutter bar carrying frame 9 is provided at its upper end with the spaced halfbearing 10 and extends from said half-bearings downwardly and forwardly, and is provided at its forward end with the stationary cutter bar attaching portion 11.

The handle attaching frame is provided with a socket 12 adapted to receive a suitable handle and with an integral yoke member 13 terminating in the spaced half-bearings 14 complementing the half-bearings 10 so as to rotatably connect the shaft 8 to the frame 9 and handle attaching frame. The screws 15 connect the half-bearings 10 and 14.

The lower, stationary cutter bar is preferably stamped from sheet metal and is provided with the back 16 connected to the forward end of the frame 9 as by the rivets 17, and the forward extending spaced, stationary blades 18 formed integrally with said back. The back 16 is also provided with the embossed depressions 19 arranged in alinement, and disposed lengthwise of the said back, and transversely with respect to the blades 18. These depressions act as ball races for the ball bearings 20 which support the back 21 of the upper, reciprocating cutter bar.

The said upper cutter bar, comprising the back 21 and the forward extending, spaced blades 22, is preferably stamped from sheet metal, the said blades being preferably formed convexo-concave as shown in Fig. 7 for the purpose of more readily retaining a sharp cutting edge at 23, as will be well understood by those skilled in the art. The back 21 is provided with the embossed ball retaining projections 24 which extend into the depressions 19 beyond the ball bearings 20, as illustrated in Figs. 1 and 2, to retain said balls within said depressions and to assist in guiding the reciprocating cutter bar in its movements with relation to the stationary cutter bar. Intermediate its ends the back 21 is provided with the slot 25, and a screw 26 extending through said slot and into the back 16 and frame 9 at 27 holds the back 21 in sufficiently close engagement with the back 16 to prevent the ball bearings 20 escaping the depressions 19 during the operation of the device.

In the member 9 to the rear of the back 16 a screw threaded, vertically disposed aperture 28 is provided into which extends a vertically disposed screw pin 29 upon which is rotatably mounted the sleeve 30. To the upper end of said sleeve is fixedly connected the oscillating roller arm 31 and to the lower end of said sleeve is fixedly connected the forwardly projecting spring holding arm 32 which, adjacent the sleeve 30, is formed with spaced side flanges 33.

On the two ends of the arm 31 are rotatably mounted the driving wheel engaging rollers 34 which are preferably provided with the transversely curved peripheries 35 bearing against the internal undulating faces of the flanges 4, as illustrated in Fig. 2.

It will be understood, from the foregoing description, that as the driving wheels rotate together the rollers 34 will be caused to travel over the undulating inner faces of the flanges 4, thereby producing an oscillating movement of the arm 31, which movement will be transmitted through the sleeve 30 to the arm 32.

For the purpose of connecting the arm 32 to the reciprocating cutter bar, and to transform the oscillating movement of the arm 32 to the reciprocating movement of the reciprocating cutter bar, the cutter bar spring 36 is provided. The said spring is somewhat upwardly arched intermediate its ends, as clearly illustrated in Figs. 1 and 5. At its rear end it is provided with the reduced portion 37 arranged between the flanges 33 of the arm 32, and somewhat forward of the said portion 37 an aperture 38 permits the passage of the adjusting screw 39 which extends into a vertical screw threaded aperture in the forward end of the arm 32. The forward end of the spring 36 is provided with the reduced portion 40 which is arranged between the upturned retaining flanges 41 of the spring attaching member 42 which is pivotally connected, as by the rivet 43 to one of the blades 22. It will be understood that as the spring 36 is oscillated by rotation of the driving wheels and the operation of the intermediate mechanism, the upper cutter bar with the blades 22 will be reciprocated, the blades 22 closely engaging and sliding over the top surfaces of the stationary blades 18.

The pressure of the reciprocating cutter bar upon the stationary cutter bar may be regulated by the screw 39 and the spring 36 acts to give a yielding downward pressure of the said reciprocating bar, thus insuring satisfactory cutting action at all times.

It is believed that from the above description the construction of parts and operation of the device will be clearly understood by those skilled in the art. While I have chosen a small grass clipper to illustrate the invention, the length of the cutter bars and the number of blades may be increased so as to produce a larger lawn mower as desired. It should be further noted that, while I have illustrated and described the best form in which I have contemplated embodying my invention, yet many changes in form and construction may be made, as circumstances require or experience suggests without departing from the spirit of the invention, within the scope of the appended claims.

I claim:—

1. A lawn mower comprising a rotatable axle, spaced driving wheels fixedly connected to opposite ends of said axle, said driving wheels provided with peripheral flanges having outer tread surfaces and opposite, inner, undulate cam surfaces, the crests of said cam surfaces of the two wheels, being alternately positioned in staggered relation with respect to each other, a frame engaging said axle intermediate said wheels, a stationary cutter bar connected to said frame, a reciprocating cutter bar connected to said frame and adapted for coöperation with said stationary cutter bar and an arm pivotally connected intermediate its ends to said frame, having its two ends in engagement with the cam surfaces of said two wheels, respectively, and means connecting said oscillating arm and said reciprocating cutter bar.

2. A lawn mower comprising a frame, spaced traveling wheels rotatably connected to said frame, said wheels provided with peripheral flanges having outer roughened tread surfaces and opposite, inner, undulate cam surfaces, the crests of said cam surfaces alternately positioned in staggered relation with respect to each other, a stationary cutter bar fixedly connected to said frame, a reciprocating cutter bar connected to said frame and adapted to cooperate with said stationary cutter bar, a roller arm pivotally connected intermediate its ends to said frame and provided at its ends with rollers engaging the cam surfaces of the two wheels, respectively, whereby said arm is oscillated by the rotation of said wheels and connecting means operatively connecting said oscillating roller arm and reciprocating cutter bar.

3. A lawn mower comprising an axle, spaced driving wheels fixedly connected to said axle, said wheels provided with peripheral flanges having outer tread surfaces and opposite, inner, undulate cam surfaces, a frame connected to said axle intermediate said wheels and having a rearwardly and upwardly extending handle attaching portion and a forwardly and downwardly extending cutter bar carrying portion, a stationary cutter bar fixedly connected to said cutter bar carrying portion, a vertically disposed sleeve pivotally connected to said cutter bar carrying portion at the rear of said cutter bar and provided at its upper end with a fixedly connected oscillating arm having its opposite ends engaging the cam surfaces of said two traveling wheels, respectively, and adapted to be oscillated by the rotation of said wheels, a forwardly projecting spring-holding arm fixedly connected to said sleeve at the lower end thereof, a reciprocating cutter bar connected to said stationary cutter bar, and a spring member operatively connecting said spring-holding arm and reciprocating cutter bar and adapted to yieldingly press said reciprocating bar against said stationary bar.

4. A lawn mower comprising a horizontally disposed, rotatable axle, spaced driving wheels fixedly connected to said axle and provided with peripheral flanges having outer tread surfaces and opposite, inner, undulate cam surfaces, a frame connected to said axle, a horizontally disposed, stationary cutter bar fixedly connected to said frame, a movable cutter bar connected to said stationary cutter bar and adapted for horizontal reciprocation thereover, an oscillating arm pivotally connected intermediate its ends to said frame upon a vertically disposed axis, having its ends in engagement with said cam surfaces, and adapted for oscillation in a horizontal plane, when said wheels are rotated, and connecting means for operatively connecting said oscillating arm and said reciprocating cutter blade.

5. A lawn mower comprising a horizontally disposed, rotatable axle, spaced driving wheels fixedly connected thereto and provided with peripheral flanges having outer tread surfaces and opposite, inner, undulate cam surfaces, a frame connected to said axle intermediate said wheels and having a downwardly and forwardly extending cutter bar attaching portion, a stationary cutter bar fixedly connected at the forward end of said attaching portion, a vertically disposed sleeve pivotally connected to said attaching portion to the rear of said stationary cutter bar and provided at its lower end with a forwardly extending spring-holding arm, a movable cutter bar overlying said stationary cutter bar and adapted for horizontal reciprocating movement thereover, a cutter bar spring connected to said spring-holding arm and to said movable cutter bar and adapted to reciprocate said movable bar when said sleeve and spring-holding arm are oscillated, adjustable means for connecting said spring and spring-holding arm and adapted to cause said spring to yieldingly press said movable cutter bar against said stationary cutter bar and an oscillating arm fixedly connected to said sleeve at the upper end thereof, extending horizontally in a plane substantially as high as the plane of said axle and having its ends in engagement with the cam surfaces of said wheels, whereby said arm may be oscillated by the rotation of said wheels.

6. A lawn mower comprising a frame, spaced, rotatable driving wheels connected to said frame, said wheels provided with peripheral flanges having outer tread surfaces and opposite, inner undulate cam surfaces, an arm pivoted intermediate its ends to said frame, provided at its ends with rollers engaging said cam surfaces, and adapted to be oscillated by rotation of said driving wheels, a stationary cutter bar fixedly connected to said frame, a movable cutter bar engaging said stationary cutter bar and adapted for reciproacting movement, and means including a spring element connecting said oscillating arm and reciprocating cutter bar and adapted to transmit operative movement from said arm to said movable bar and to transform the oscillating movement of said arm to reciprocating movement of said bar, said spring element adapted to yieldingly press said movable bar against said stationary bar.

7. In a lawn mower, a frame, driving wheels rotatably connected to said frame, a stationary cutter bar connected to said frame, a reciprocating cutter bar, arranged upon said stationary cutter bar, an oscillating, adjustable spring member pivotally connected to said frame and to said reciprocating bar, and adapted to press said reciprocating bar against said stationary bar and to reciprocate said reciprocating bar when said spring member is oscillated, and operative connecting means between said driving wheels and oscillating spring member, whereby said spring member is oscillated when said wheels are rotated.

In testimony that I claim the above, I have hereunto subscribed my name in the presence of two witnesses.

ARTHUR B. KIDDER.

Witnesses:
WILLIAM H. MILLER,
SYLVIA BORON.

Copies of this patent may be obtained for five cents each, by addressing the "Commissioner of Patents, Washington, D. C."